Figure 4:
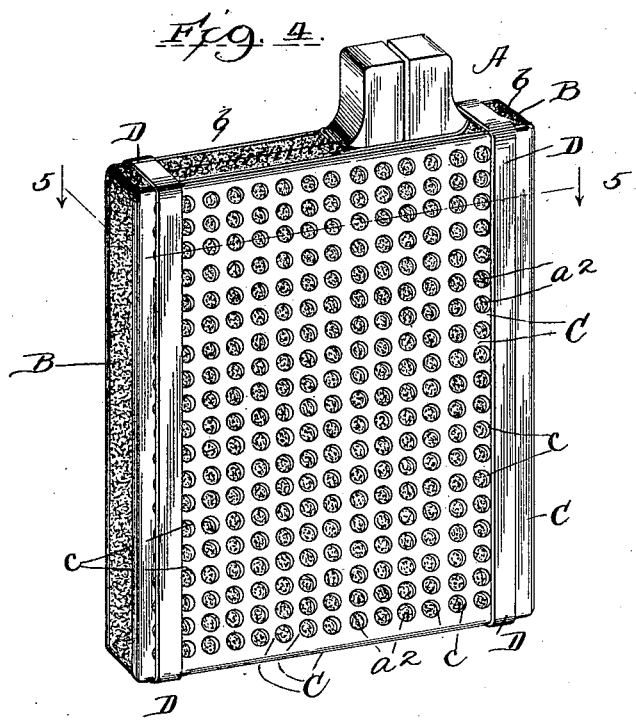

No. 674,501. Patented May 21, 1901.
W. GARDINER.
STORAGE BATTERY.
(Application filed Aug. 8, 1900.)
(No Model.) 2 Sheets—Sheet 1.
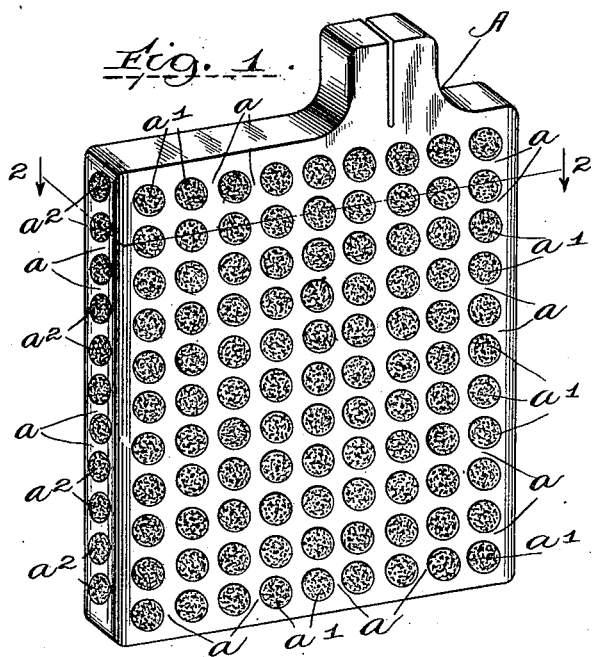
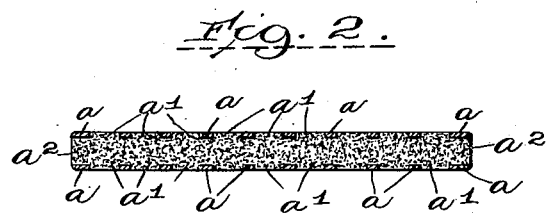
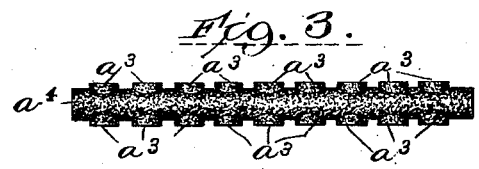

No. 674,501.  Patented May 21, 1901.
W. GARDINER.
STORAGE BATTERY.
(Application filed Aug. 8, 1900.)

(No Model.)  2 Sheets—Sheet 2.

Witnesses:
Ray White
Harry R. White

Inventor
William Gardiner
By Torée Bewitt
Attorney.

THE NORRIS PETERS CO., PHOTO-LITHO., WASHINGTON, D. C.

UNITED STATES PATENT OFFICE.

WILLIAM GARDINER, OF CHICAGO, ILLINOIS.

STORAGE BATTERY.

SPECIFICATION forming part of Letters Patent No. 674,501, dated May 21, 1901.

Application filed August 8, 1900. Serial No. 26,225. (No model.)

*To all whom it may concern:*

Be it known that I, WILLIAM GARDINER, a citizen of the United States, residing in Chicago, county of Cook, and State of Illinois, have invented certain new and useful Improvements in Electric Accumulators or Storage Batteries; and I do hereby declare the following to be a full, clear, and exact description, such as will enable persons skilled in the art to which it appertains to make and use the same.

My invention relates to electric accumulators or storage batteries, my object being to provide an improved construction of accumulator or battery adapted for electric vehicles and other uses in which the battery is subjected to considerable shaking and jarring, my purpose being to so construct the battery that the electrodes or elements thereof will be protected from the destructive effects of "washing" by the electrolyte and whereby the active material within the elements will be securely held in position and short-circuiting of the plate is effectively prevented.

In accordance with my invention I provide a plate or metal structure and perforate the said plate in a peculiar manner, whereby the active material when placed within the said perforations will be held securely therein on account of the peculiar formations of the said perforations. I then place the said element in a pocket of a suitable material and completely close the pocket around the said element or plate and leave only the projecting contact-lug of the element sticking through the said pocket. By entirely closing the plate in the said pocket short-circuiting due to exterior or interior causes is absolutely prevented. After the plate has been placed in the pocket and the said pocket has been sewed up in the proper manner I then place a sheet of perforated thin non-conducting material, such as hard rubber, on each side of the said plate and over the said pocket and hold the said perforated material in contact with the plate by means of rubber bands. These rubber bands, in connection with the pocket and with the perforated material, answer the purpose of separators between the adjoining elements of the said battery.

Heretofore it has been customary to make the separators of sheet or felt paper, asbestos, or other like material and interpose the same between the battery-plates. I have found in practice that this sort of separator is not satisfactory, for the reason that when it is unsupported except by the continuity of the element-plates within the battery, it becomes soft, loses its linear rigidity, and frequently falls off or settles down between the battery-plates, leaving the upper portion of the elements exposed and unprotected. Furthermore, it becomes soft by the action of the acid, and when the battery is taken to pieces and reassembled it is usually found that the separator is entirely destroyed by the action described. I prefer to inclose my plate in a complete pocket of a flexible porous material that will not be readily affected by the action of the electrolyte and to support the said material upon either side of the plate by means of a more rigid unyielding perforated insulating-plate and to hold the said pocket and plate in position by means of rubber bands. As a result of this construction a very efficient element is provided. The active material cannot possibly fall out and short-circuit the cell by connecting the plates at the bottom, and bits of conducting substance cannot similarly injure the cell by falling across the tops of the respective plates. The rubber bands and coverings are sufficiently yielding to provide for the variation in the plate due to expansion which results from charging and discharging the battery. By constructing the pocket of a flexible material and by placing a rigid support or plate on the outside of the said pocket the inequalities of the plate are brought into contact with the flexible pocket and the entire surface of the plate is supported.

Figure 5:
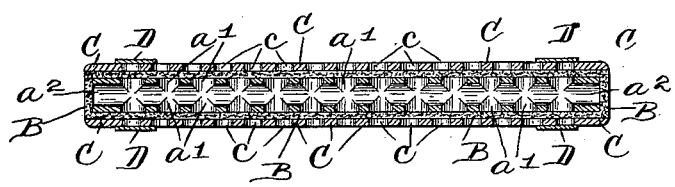

In the drawings, Figure 1 shows my plate in its completed form, ready to be inclosed within the pocket. Fig. 2 is a transverse section taken on line 2 2 of Fig. 1. Fig. 3 shows the form of the active material contained within the perforation through which the section Fig. 2 is taken. Fig. 4 is a completed element ready to be immersed within the cell. Fig. 5 is a transverse section taken on line 5 5 of Fig. 4.

In all of the views the same letters of reference are used to indicate similar parts.

A is a metal structure of my plate. *a* is the metal between the perforations of the said plate.

$a^2$ represents a series of parallel longitudinal perforations made in the edge of the plate and extending entirely through the same. Another series of holes (represented by $a'$) are drilled in the sides of the plate and intersect the holes $a^2$.

In Fig. 3, $a^3$ and $a^4$ show the shape of the active material when the perforations corresponding therewith are filled.

For the purpose of my invention the perforations may be filled by electrochemical process, or the oxid may be made into a paste and chemically applied.

The pocket B may be made of asbestos or other flexible fabric or sheet material, the plates placed therein, and the said pocket sewed at $b$, as shown in Fig. 4. A sheet of hard rubber or other suitable material C, containing a number of perforations $c$, is then placed upon either side of the pocket containing the plate, and the rubber bands D are placed over the entire element. By this means the bands hold the sheet C firmly in contact therewith. The element is shown complete in Fig. 4 and is ready to be placed within the cell. As a result of this construction the respective elements of the cell may be placed very close together without possibility of the conducting parts being brought together and causing a short circuit, and by reason of their close approximation the internal resistance of the cell is much lower than usual in batteries of this class.

One advantage accruing from the particular manner in which I perforate my plate consists in the formation of gas-pockets or interstices in the horizontal perforations between the perforations that are lateral thereto. These openings are the result of the unequal tendency of the perforations to become filled with active material when it is either chemically or mechanically applied. The pockets referred to contain hydrogen gas, which increases the efficiency of the plate.

Having described my invention, what I claim as new, and desire to secure by Letters Patent of the United States, is—

An element for an electric accumulator, comprising a plate, perforations in said plate containing active material, a pocket of absorbent material entirely inclosing the said plate, a perforated support on each side of the said pocket, elastic bands for holding said supports in contact with said pocket, and a contact-lug from the said plate extending through a perforation in the top of said pocket, substantially as set forth.

In testimony whereof I have signed this specification, in the presence of two subscribing witnesses, this 27th day of July, A. D. 1900.

WILLIAM GARDINER.

Witnesses:
LILLIAN HOLLAND,
FORÉE BAIN.